United States Patent [19]

Bonafous

[11] 4,006,882
[45] Feb. 8, 1977

[54] BUTTERFLY VALVE OF LARGE DIAMETER

[75] Inventor: Maurice Bonafous, Gurmenicon, France

[73] Assignee: Applications Mecaniques et Robinetterie Industrielle A.M.R.I., Paris, France

[22] Filed: Jan. 31, 1975

[21] Appl. No.: 546,188

[30] Foreign Application Priority Data

Feb. 6, 1974 France .............................. 74.03970

[52] U.S. Cl. ............................. 251/306; 251/308; 137/269; 277/189; 277/199
[51] Int. Cl.² .......................................... F16K 1/18
[58] Field of Search .......... 251/306, 307, 314, 361, 251/364, 304, 308, 305; 277/154, 189, 199; 137/269, 271

[56] References Cited

UNITED STATES PATENTS

| | | | |
|---|---|---|---|
| 2,768,036 | 10/1956 | Greenough | 277/199 |
| 2,936,153 | 5/1960 | Gaffin | 251/306 |
| 3,024,802 | 3/1962 | Stillwagon | 251/306 |
| 3,095,619 | 7/1963 | Peterson | 277/189 |
| 3,143,132 | 8/1964 | Pangburn | 251/306 |
| 3,311,128 | 3/1967 | Taylor | 251/306 |
| 3,544,066 | 12/1970 | Fawkes | 251/306 |
| 3,840,042 | 10/1974 | Brundage | 251/306 |

Primary Examiner—William R. Cline
Assistant Examiner—H. Jay Spiegel

[57] ABSTRACT

A butterfly valve of large diameter which comprises a body with a substantially cylindrical inner bore, internally lined with a ring that terminates at lateral flanks of the valve; a butterfly pivotally mounted in the body by means of valve spindles that pass through the body and the ring; wherein the body includes at least two annular grooves that are coaxial with respect to the bore; the ring being constructed with several aligned sections, such as two curvilinear sections and a plurality of rectilinear sections; wherein the ends of the sections are formed and vulcanized to shape after having been aligned; the ring further including, on its side adjacent the body, at least two annular tenons with heads that respectively engage the grooves, these tenons being smaller than the groove inlets; an empty space being provided between the tenons and the grooves, filled at the time of assembly with a plastic material that hardens by polymerization, for example an epoxy resin. Optionally, the body may have passages therein for the valve spindles, the ring may further include a flange, and screws may be provided at the ends of the passages for regulating the axial compression of the flange about the valve spindles.

3 Claims, 10 Drawing Figures

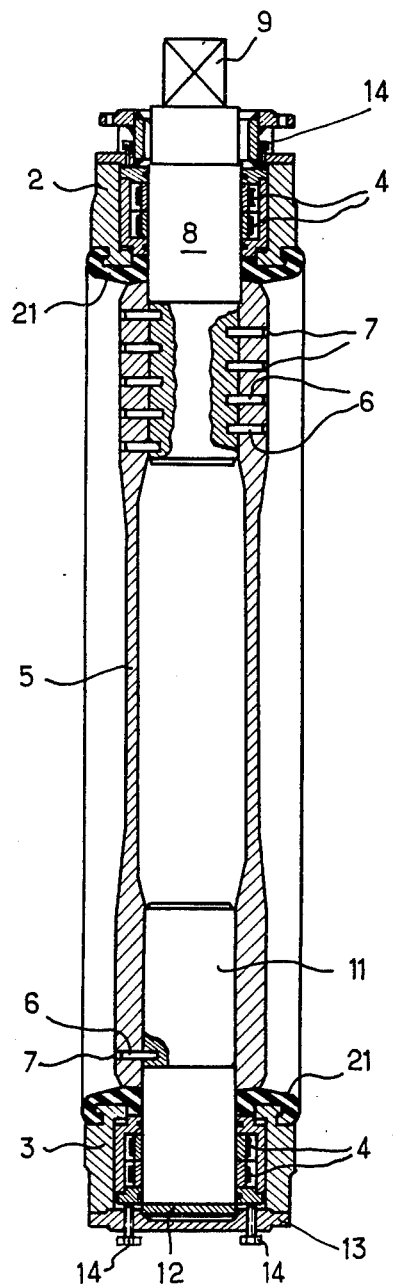
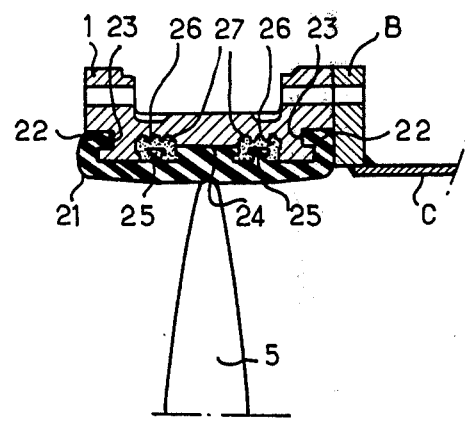
Fig. 2
Fig. 3

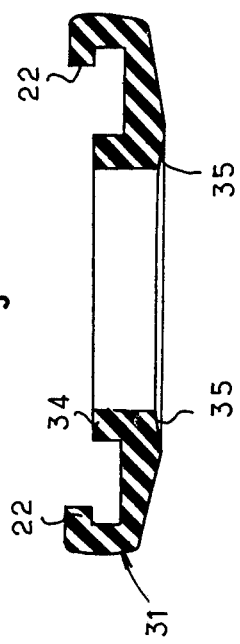
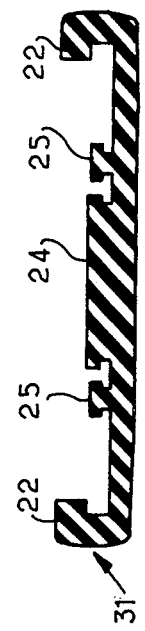
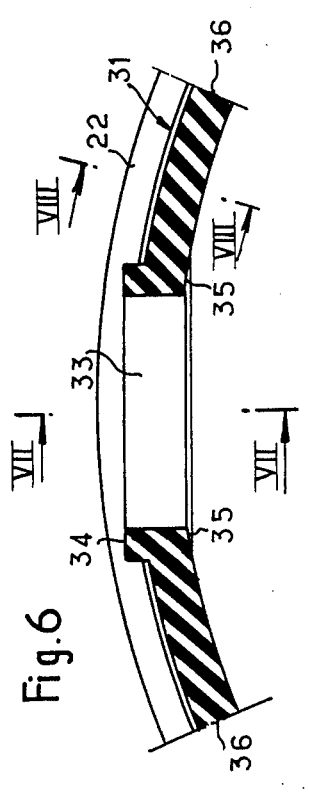
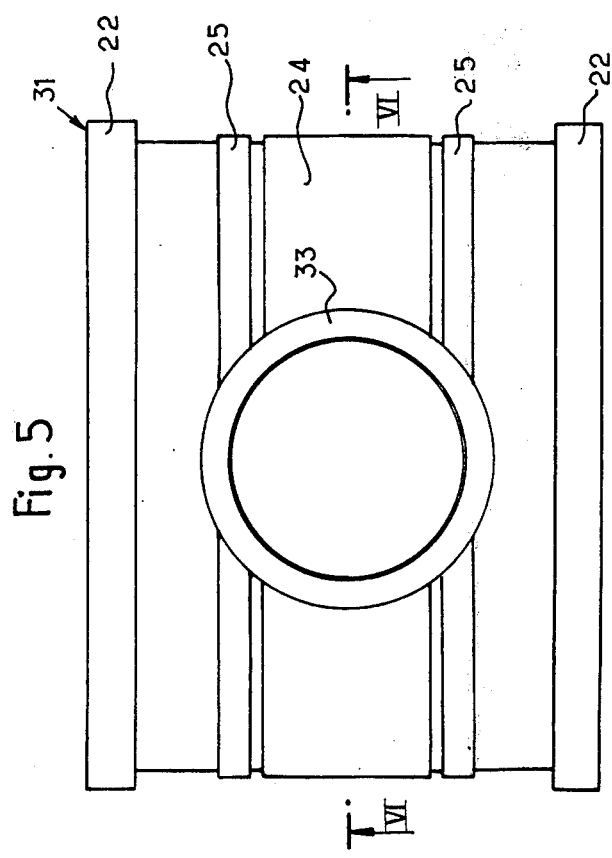

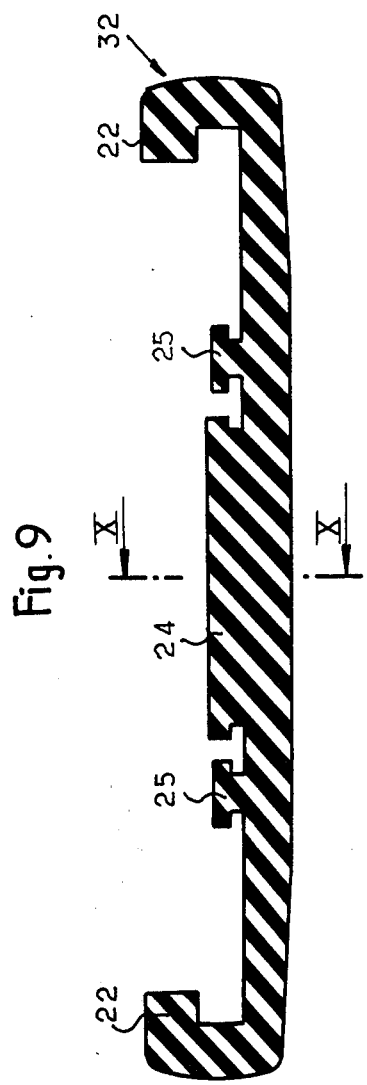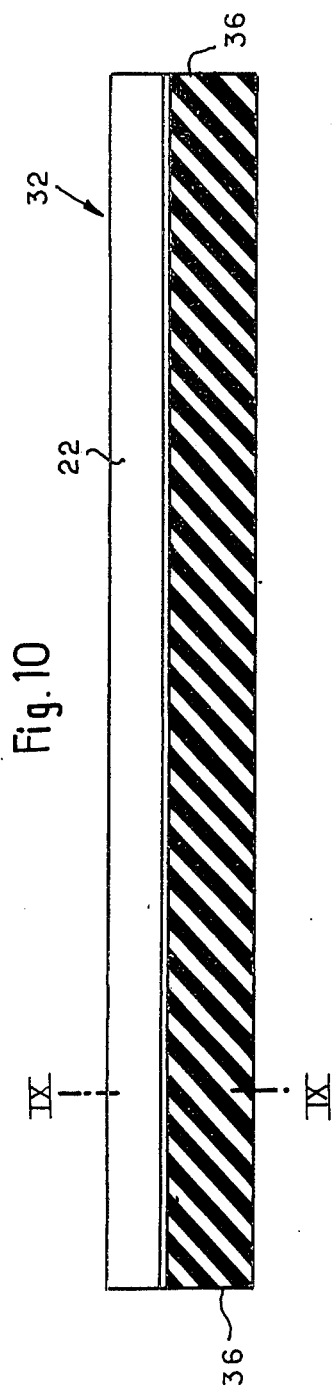

BUTTERFLY VALVE OF LARGE DIAMETER

The invention relates to butterfly valves of large diameter, for example valves whose internal diameter is 1 meter or more.

Conventionally, a butterfly valve comprises a cylindrical body, lined internally with a ring of resilient material, against which the butterfly may bear in a tight manner when the valve is closed. When the valve has a large diameter, the attachment of the ring to the body, generally carried out by tenons and grooves, becomes generally inadequate; in addition, the conventional production of the ring becomes difficult and troublesome.

It is the object of the invention to eliminate this difficulty and these drawbacks.

To this end, in the butterfly valve of large diameter according to the invention, the ring comprises at least two annular tenons having a head, the body comprises two annular grooves wider at the base than at the inlet and wider at their inlet than the head of the tenon fitting therein. At the time of assembly, the empty space between the tenon and the groove is filled by a plastics material hardening by polymerisation, for example an epoxy resin. Once the plastics material has hardened, the ring cannot be dismantled and to remove it, it is necessary to burn it to destroy the epoxy resin.

The tenon heads may be in the shape of a V, L or T and likewise, the grooves may be in the shape of a V, L or T or any other shape providing an anchorage.

According to another feature of the invention, the ring is constructed from several parts or sections, namely two curvilinear sections for the passage of the valve spindle and a plurality, for example eight, rectilinear sections. After being cut to length, the ends of the sections are prepared and vulcanised in shape and when the ring is mounted in the body, the rectilinear sections assume the curvature of the latter.

An unexpected and surprising advantage of the invention results from this structure of sections: with the same sections, it is sufficient to vary the number thereof and if necessary, the cutting to length, to obtain a series of rings of different diameters, capable of equipping a series of valves of different diameters. In addition, the valves of such a set may have the same spindles and same bearings. This results in simplification of supplies, manufacture, spares, thus reductions in cost. Purely as an example, a set of this type with the same sections is produced which covers the following six diameters: 1.100/1.200/1.250/1.400/1.500/1.600 meters; another range covers the eight diameters 1.800/2.000/2.200/2.400/2.600/2.800/3.000/3.200 meters.

One embodiment of a butterfly valve according to the invention will be described with reference to the following figures, given as non-limiting examples:

FIGS. 2 and 3 are sections on lines II—II and III—III of FIG. 1;

FIG. 5 is a plan view of a curvilinear section of FIG. 4;

FIGS. 6, 7, 8 are sectional views on lines VI—VI of FIG. 5 and VII—VII and VIII—VIII of FIG. 6; and FIGS. 9 and 10 are sectional views on lines IX—IX of FIG. 10 and X—X of FIG. 9, of a rectilinear section of FIG. 4.

Figure 1:
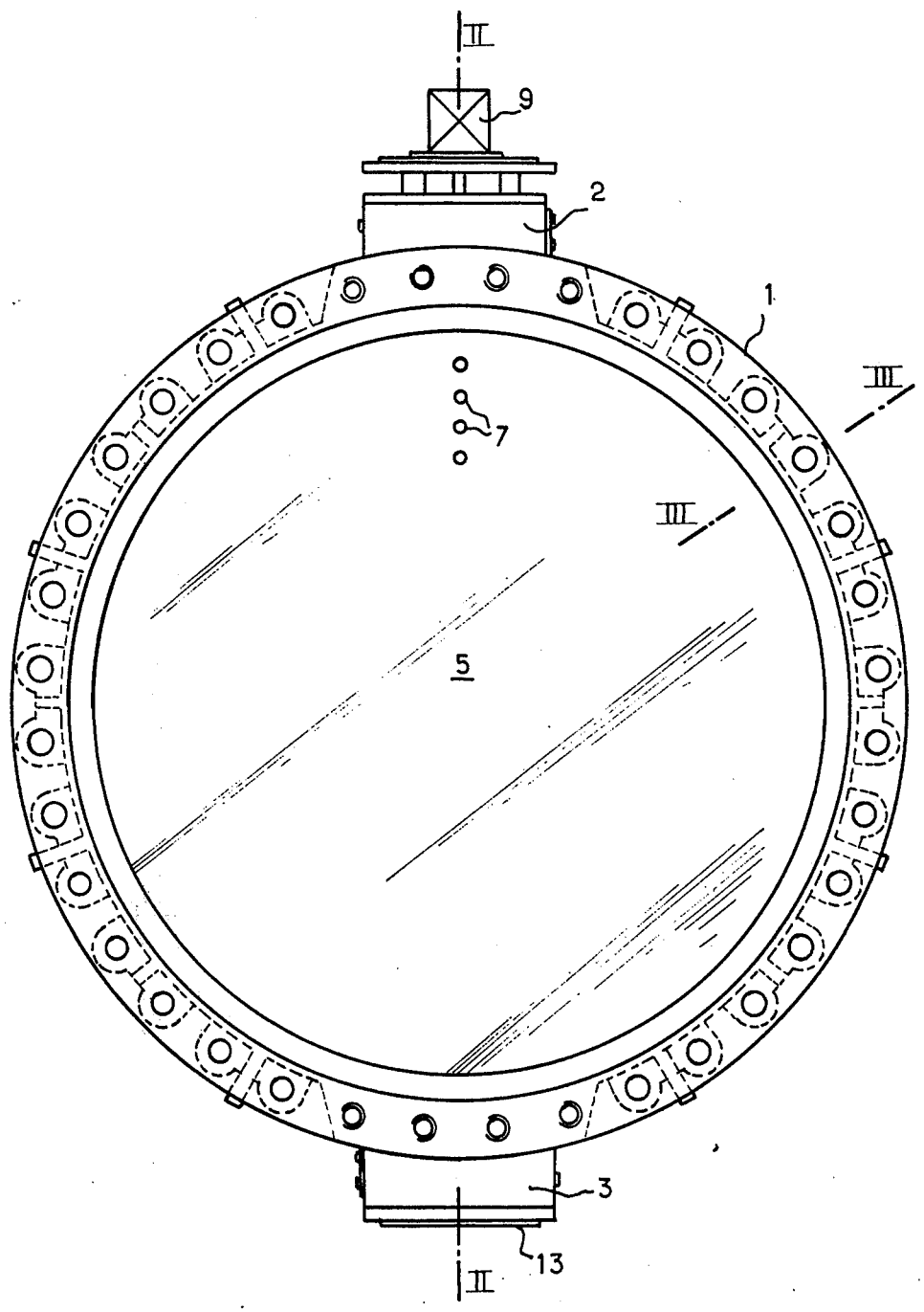
FIG. 1 is an elevational view of an exemplary embodiment of the invention.

Referring to FIGS. 1 and 2: this butterfly valve comprises a cylindrical body 1, with two transverse passages 2 and 3, in which plain or needle bearings 4 retain a spindle of the butterfly 5. The butterfly 5 is mounted, on the one hand, by shearing pins 6 covered by expandable stoppers 7, on an upper spindle 8 leaving at 9, for the operation of the valve and, on the other hand, on a lower spindle 11. The lower transverse passage 3 contains a bush 12 retained by a cap 13. At the top and the bottom, screws 14 make it possible to regulate the compression of a flange 33 and thus the seal of a spherical portion of a ring 21 on a spherical segment 35 of the butterfly 5.

With reference to FIGS. 2 and 3: the ring 21 of resilient material covering all the inside of the body 1, for example of ethylene-propylene, has a section in the form of a flattened U, with two turned-back parts 22 fitted in lateral grooves 23 of the body and ensuring the lateral seal by clamping (see a flange B, and a conduit C), with a large central T-shaped tenon 24 and two T-shaped tenons 25. The body 1 comprises two annular grooves 26 wider than the heads of the tenons 25 and a space 27 remaining between the body 1 and the ring 21 is filled with an epoxy resin which is then polymerised.

Figure 4:
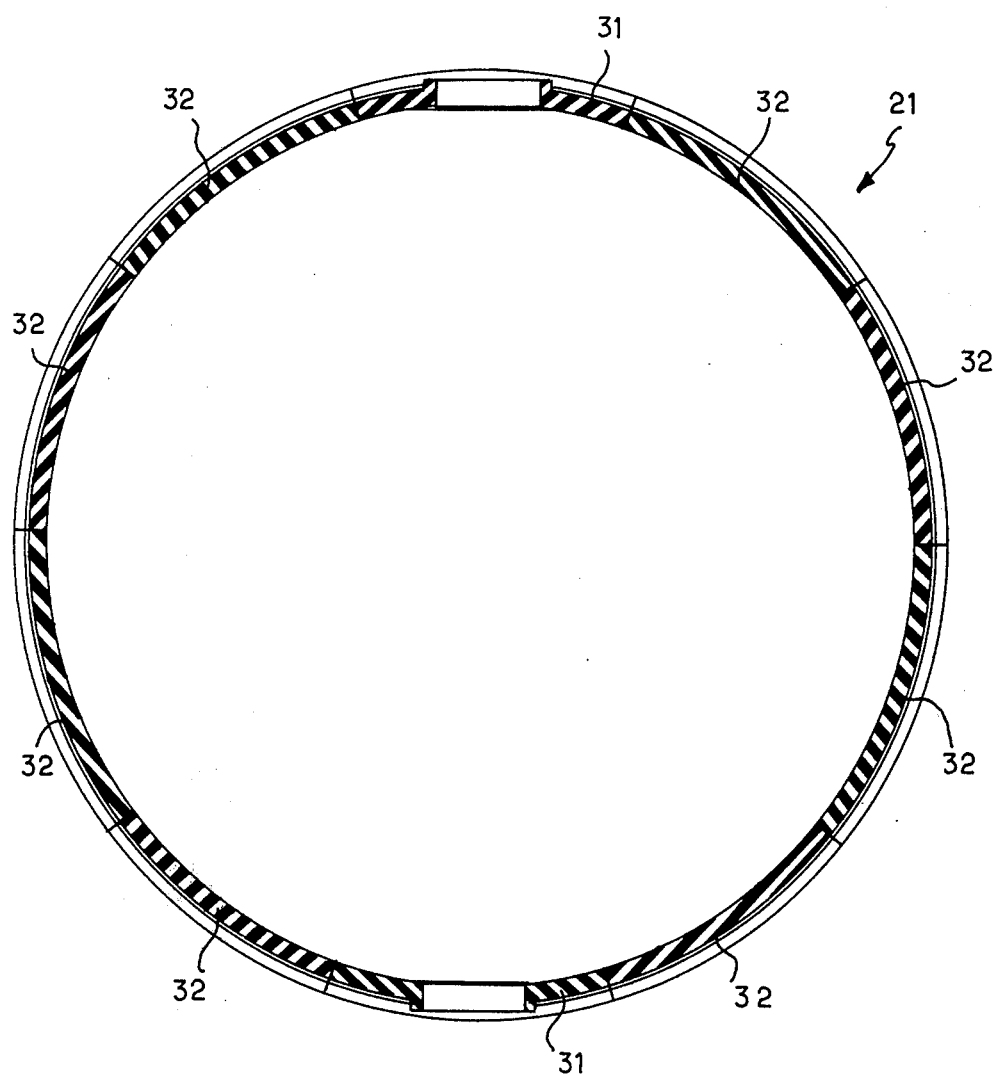
FIG. 4 is an elevational view of the ring of FIG. 1.

With reference to FIG. 4: this ring 21 is composed of two curvilinear sections 31 for the passage of the spindle and eight rectilinear sections 32, as already mentioned, other rings 21 may be produced from the same sections, using a different number of rectilinear sections.

With reference to FIGS. 6 to 8: apart from its two turned-back parts 22 and its three tenons 24 and 25, the curvilinear section 31 forms the flange 33 for the passage of the spindle and, on the inner side, the section 31 has, at 35, the shape of a spherical segment in order to co-operate with the butterfly (not shown). Tenon portions of the sections 31 are shown at 34.

FIGS. 9 and 10 likewise represent a rectilinear section 32.

To assemble two curvilinear sections 31 and eight rectilinear sections 32, two of the rectilinear sections are cut to length (to provide the desired length at each of the two sides of the ring 21), all lateral faces 36 of the sections are prepared and the entire arrangement is vulcanised in shape (FIG. 4).

I claim:

1. A butterfly valve of large diameter, comprising: a cylindrical body having a substantially cylindrical inner bore defined at its outer ends by spaced-apart parallel side walls and being lined in its interior with an elastic seat in the form of a ring that terminates at said parallel side walls of said valve body; said ring having a substantially U-shaped cross-section that conforms to the configuration of said bore; a butterfly pivotally mounted in said body by means of valve spindles that pass through said body and said ring; wherein said body includes at least two annular grooves, each of which having an opening at its innermost end into said bore, and being closed at its outermost end; said grooves being coaxial with respect to said bore, opening thereinto, and being narrower at said innermost ends than at said outermost ends; said ring being constructed of a plurality of sections that are disposed in an end-to-end relationship, said sections including two sections having a curvilinear outer shape for the passage of said valve spindles and of the valve, and a plurality of rectilinear sections; the ends of said sections being formed and vulcanized to shape after having been aligned with each other; said ring further including, on its side adjacent said body, at least two annular tenons that have heads which respectively engage said grooves; said tenons being smaller than said openings of the grooves; and wherein an empty space is provided between said tenons and said grooves, said empty space being filled with a plastic material that hardens by polymerization, to retain said ring in said body.

2. The butterfly valve as defined in claim 1, wherein said ring has therein at least one of said passages for the spindles; and further comprising a flange; and screws threadable onto said body about the ends of said passages, for regulating the axial compression of said flange about said spindles.

3. The butterfly valve as defined in claim 1, wherein said plastic material in said empty space is an epoxy resin.

* * * * *